Dec. 22, 1931.  N. W. MORSE  1,837,572
PNEUMATIC LUBRICANT COMPRESSOR
Filed Sept. 15, 1928  2 Sheets-Sheet 1
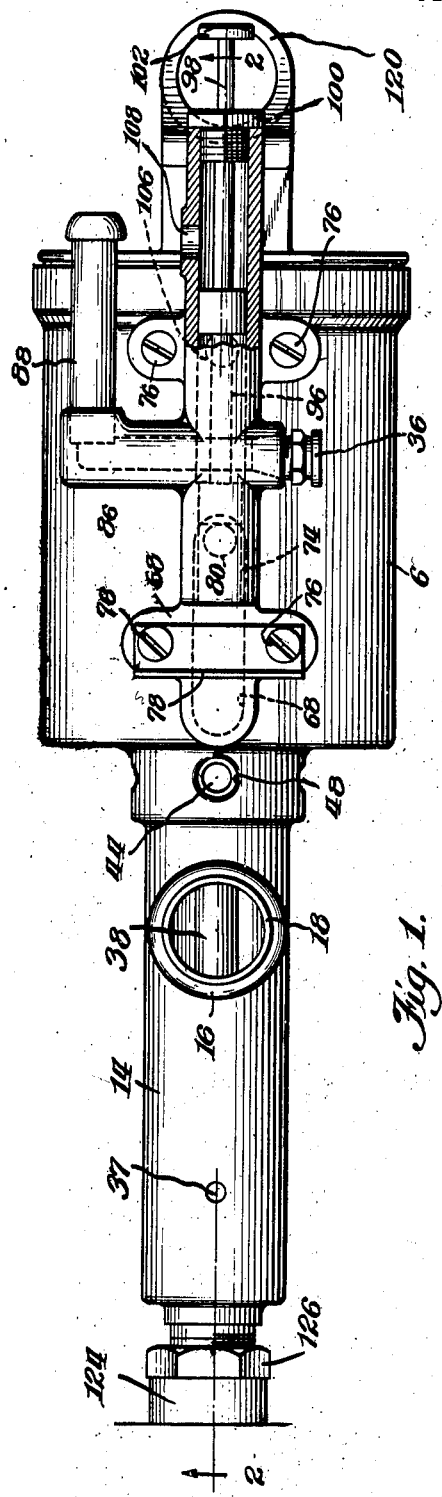
Fig. 1.
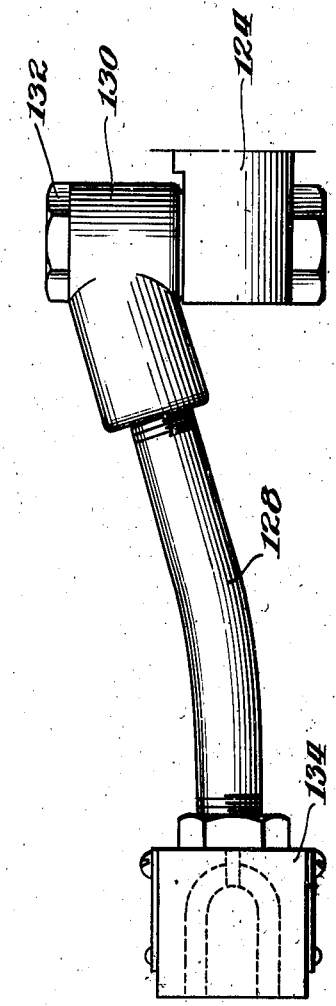
Fig. 1ª.
Inventor
Normand W. Morse
By Williams, Bradbury, McCaleb & Hinkle
Attys.

Dec. 22, 1931.   N. W. MORSE   1,837,572
PNEUMATIC LUBRICANT COMPRESSOR
Filed Sept. 15, 1928   2 Sheets-Sheet 2

Inventor
Normand W. Morse
By Williams, Bradbury, McCaleb & Hinkle
Attys.

Patented Dec. 22, 1931

1,837,572

UNITED STATES PATENT OFFICE

NORMAND W. MORSE, OF CHICAGO, ILLINOIS, ASSIGNOR TO ALEMITE CORPORATION, OF CHICAGO, ILLINOIS, A CORPORATION OF DELAWARE

PNEUMATIC LUBRICANT COMPRESSOR

Application filed September 15, 1928. Serial No. 306,165.

My invention relates, generally, to lubricating apparatus and more particularly to pneumatically operated lubricating compressors for use in forcing heavy greases to bearings under high pressure.

It is an object of my invention to provide an improved pneumatically operated lubricant compressor which is light in weight and thus readily portable, which is of extremely simplified construction, and which will operate satisfactorily under various conditions of usage.

Another object of my invention is to provide improved plunger sealing means in a pneumatically operated lubricant compressor.

A further object is to provide an improved arrangement of cylinders and plungers in a compressor of this type.

Figure 2:
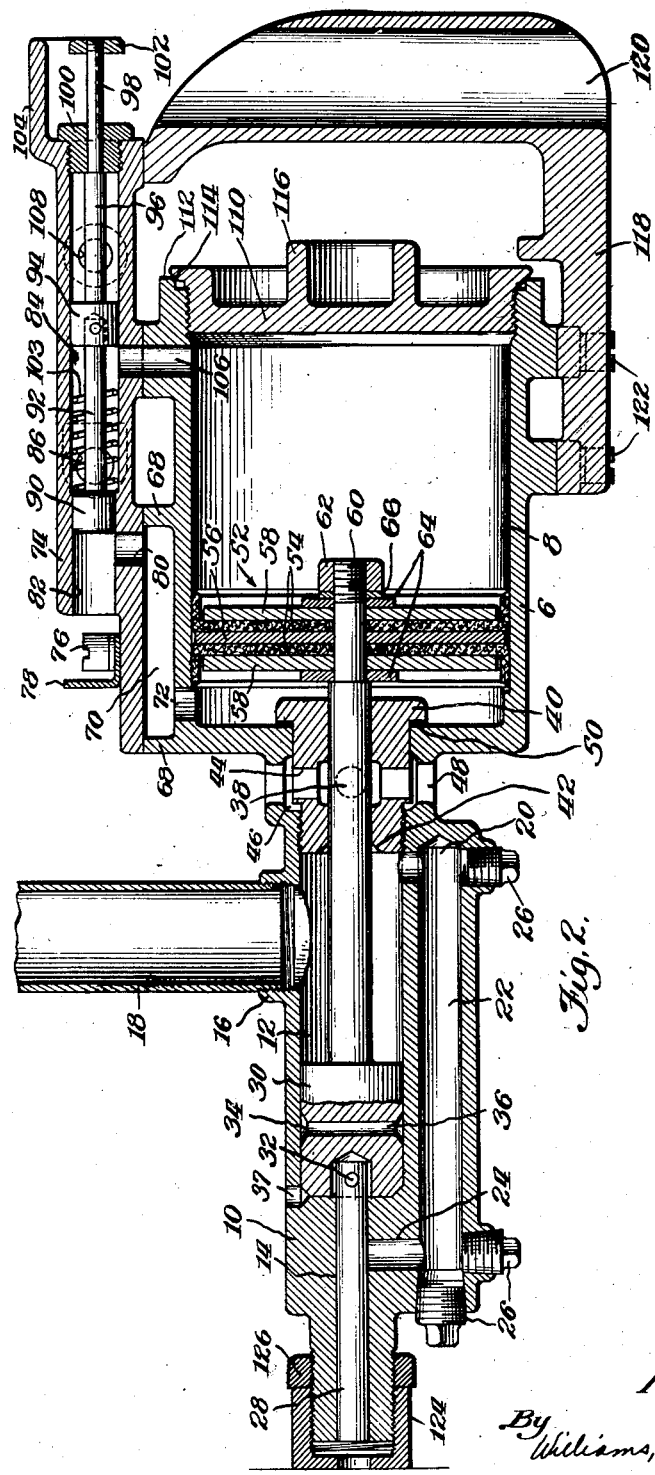
Figure 2A:
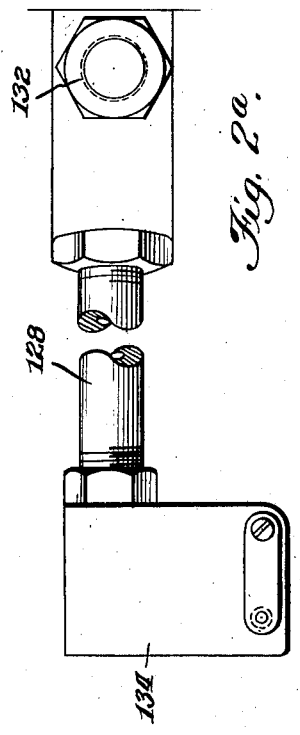

Other objects will appear from the following description, reference being had to the accompanying drawings, in which Figure 1 and Figure 1a together constitute a plan view of my improved compressor with its discharge conduit and coupling;

Figure 2 is a central vertical sectional view taken on line 2—2 of Figure 1; and Figure 2a is a side elevation of the discharge conduit and coupler.

In the lubrication of crank pin and other large bearings on locomotives and similar machines where the bearings are subjected to great stresses, it is desirable to use a very heavy grease as a lubricant. As customarily employed, this grease is marketed in cylindrical sticks which have, in the past, usually been inserted in the bearing hole and then forced into the bearing by screwing down upon a cap which is threaded in the bearing hole. Difficulty has been experienced in the past to handle this extremely heavy lubricant since enormous pressures are required. Thus, many attempts to lubricate bearings with this heavy grease lubricant by means of a compressor detachably connected to a fitting screwed into the oil hole of the bearing have been unsuccessful due to the lack of a compressor capable of efficiently handling this heavy grease and forcing it into the fitting under the extremely high pressures necessary. The compressor which I have invented is capable of accomplishing the above described objects and is an improvement upon the compressor disclosed in my co-pending application, Serial No. 273,515, filed April 28, 1928.

The compressor comprises a casting 6 having an air cylinder 8 bored therein. The casting 6 has an integral extension 10 which is bored and drilled to form a low pressure lubricant cylinder 12 and a high pressure lubricant cylinder 14. The cylinder 12 has an inlet port 16 at which a cylindrical tube 18 is threaded, the latter serving as a guide for feeding sticks of lubricant to the cylinder 12. The cylinder 12 has a discharge port 20 which leads to a longitudinally bored passage 22, the forward end of which is connected by a duct 24 with the high pressure cylinder 14.

Plugs 26 close the openings necessary to permit drilling of the port 20, passageway 22 and duct 24. These plugs may readily be removed for cleaning these passageways connecting the low and high pressure cylinders.

A high pressure plunger 28 is reciprocable within the cylinder 14 and fits in a recess formed in the end of the low pressure piston 30, being connected thereto by a pin 32 which passes transversely through the piston 30 and plunger 28. The piston 30 is provided with a diametrically drilled hole 36 having countersunk ends 34 into which a suitable pin may be inserted to hold the piston against rotation when the parts are being assembled. A vent aperture 37 admits air to prevent the formation of a vacuum behind the piston 30 as it moves to the right (Fig. 2) and during the leftward stroke of the piston permits the escape of any air or lubricant which may have been trapped behind the piston.

The piston 30 has a stem 38 formed integrally therewith, the stem extending rearwardly through a bushing 40 which is threaded at the rear end of the cylinder 12. This bushing has a slightly tapered portion 42 which forms a pocket around the stem 38 in which grease may collect and serve as a seal to prevent leakage of the lubricant between the bushing and the stem. The bushing also has a plurality of radial ports 44 which communicate with an annular passageway 46 formed in the casting 6. A plurality of openings 48 connect the passageway 46 with the atmosphere. A gasket 50 is used to seal the bushing in the cylinder 8.

An air piston 52, comprising a pair of oppositely facing cup leathers 54, a backing plate 56 and a pair of face plates 58, is secured upon the reduced end portion 60 of the stem 38 by means of a nut 62, suitable flat washers 64 and a lock washer 66 being interposed properly to position the air piston on the reduced portion 60.

The casting 6 has a flange 68 at its top above the cylinder 8, the flange defining a passageway 70 which communicates with the cylinder 8 through a port 72. A valve body 74 is secured upon the flange 68 by screws 76, the forward screws 76 serving also to hold an air deflector angle 78. The valve body 74 has a port 80 communicating between the passageway 70 and a cylindrical bore 82 at the forward end of the valve body. A cylindrical bore 84, co-axial with and of slightly larger diameter than the bore 82, is formed in the rearward end of the valve body and is normally in communication with a suitable source of fluid under pressure, such as compressed air, through an elbow passageway 86, the other end of which communicates with a nipple 88 adapted to be connected with a hose. A differential piston valve comprises a piston 90 fitting in the cylinder 82 and having a stem 92, and a relatively larger piston 94 which is pinned to the stem 92 and has a rearwardly projecting stem 96. The stem 96 has a portion 98 of reduced diameter guided in a bushing 100 threaded in the rearward end of the cylinder 84. A suitable thumb piece 102 is threaded at the extremity of the end portion 98.

A spring 103 which is shorter than the distance between the pistons 90 and 94 is confined in the cylinder 84 and has one end normally resting against the shoulder formed between the cylinders 82 and 84. As the piston valve is being returned from its leftmost position, its piston 90 covers the port 80 for a short time and during this time air pressure is exerted on the lower side of the piston 90, forcing the piston tightly against the upper lateral surface of the cylinder 82, causing an appreciable increase in friction.

The spring 103 is of such length that it will abut against the piston 94 while the piston 90 covers the port 80 and thus overcome the aforesaid friction. As soon as the piston valve has moved to the right sufficiently to permit escape of air from the port 80 to the atmosphere the said friction will materially lessen so that the air pressure (due to the difference in effective areas of the pistons 90 and 94) will be sufficient to return the piston valve to the position shown in Fig. 2. A guard 104, semicircular in cross section, prevents damage to and accidental reciprocation of the thumb piece 102 and stem portion 98.

The cylinder 84 has a port 106 leading into the rearward end of the air cylinder 8 and has an exhaust port 108 open to the atmosphere. The end of the cylinder 8 is closed by a cap 110 threaded in the cylinder. The connection between the cap and cylinder is kept air-tight through cooperation of a sharp cornered flange 112 with a beveled surface 114 on the cap. The cap has a hollow hexagonal boss 116 by which the cap may be screwed into the cylinder casting. A handle 118, having a hollow grip portion 120 is secured to the casting 6 by a plurality of fillister head cap screws 122.

A discharge conduit 124 is threaded at the discharge end of the high pressure cylinder 14, being locked to the cylinder casting by a nut 126. The conduit member 124 forms one half of a swivel connection with a pipe 128. The other half 130 of the swivel is secured to the conduit member 124 by a bolt 132.

The pipe 128 is offset so that its outer end, which carries a coupling member 134, is in substantial alignment with the axis of the high pressure cylinder 14. The coupling is adapted to make a detachable connection with a suitable lubricant receiving fitting of the general type shown at 136 threaded into the valve body 74 so as to supply lubricant for the piston valves 90 and 94.

The operation of the compressor is as follows:

Assuming that a source of compressed air is connected to the nipple 88 by any suitable flexible conduit, and that a stick of grease has been inserted in the feeding tube 18, the operator will connect the coupling 134 to a lubricant receiving fitting screwed into the oil hole of the bearing to be lubricated, and then press the thumb piece 102, thereby moving the piston valves 90, 94 to the left and connecting the left-hand end of the cylinder 8 with the source of air under pressure by uncovering the port 80. Air will then flow from the passageway 86 through the cylinder 84, the right-hand end of the cylinder 82, port 80, passageway 70 and port 72 into the cylinder 8 and build up a pressure therein which, acting upon the piston 52, will draw the high and low pressure pistons 28 and 30 to the right. As the low pressure piston passes the port 16 it will cut off a portion of the stick of grease and force it through the port 20, passageway 22 and duct 24 to the high pressure cylinder 14, the duct 24 being at that time uncovered by the plunger 28.

The movement of the air piston 52 to the right will be limited by the abutment of piston 30 with the bushing 40. During this movement of the piston the air in the right-hand portion of the cylinder 8 will escape through the port 106, the right-hand portion of the cylinder 84 and the exhaust port 108. Upon completion of this stroke the operator will release the thumb piece 102 permitting the valve to return to the position shown in Figure 2, at first under the influence of the compression of the spring 103 and the air pressure (due to the fact that the area of the piston 94 exposed to air under pressure is greater than the corresponding area of the piston 90.), and later by air pressure alone as previously described.

As the valve moves to the right the compressed air in the cylinder 8 to the left of the piston 52 will exhaust to the atmosphere through the port 72, passageway 70, port 80 and cylinder 82. The stream of exhaust air is deflected and dispersed by the angle 78. At the same time air under pressure is admitted to the cylinder 8 to the right of the piston 52 through the port 106 which will at that time be in communication with the passageway 86 through the cylinder 84. The air under pressure behind the piston 52 will thus force the piston, together with the plunger 28 and low pressure piston 30, to the left, thereby expelling the lubricant which was previously forced into the high pressure cylinder 14.

Since the effective area of the air piston 52 is very many times as great as the effective area of the plunger 28, the lubricant will be forced from the compressor under extremely high pressures. The diameters of the piston 52 and plunger 28 may, of course, be varied to obtain any desired discharge pressure.

The operation above described may be repeated several times until sufficient lubricant has been forced into the bearing. The trough-like groove 34 in the piston 30 collects grease which serves as a seal to prevent passage of further grease past the piston 30. If, however, some grease should escape past the piston it will not interfere with the operation of the compressor since it will be expelled through the port 37. Any lubricant leaking between the stem 38 and bushing 40 will be collected and discharged to the atmosphere through the ports 38, 48.

It will be observed that upon both the priming stroke and upon the discharge stroke of the compressor the full pressure of the air is utilized since the air pressure need not overcome any force other than a small amount of mechanical and hydraulic friction. Valves, stuffing boxes, etc., which would tend unnecessarily to increase the friction have been eliminated, making the compressor very efficient and durable.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a lubricant compressor for discharging heavy lubricants under high pressure, the combination of a body having an air cylinder, a low pressure priming cylinder and a high pressure cylinder formed therein in substantial axial alignment, a piston in said air cylinder, a low pressure piston in said low pressure cylinder rigidly connected to said air piston, a plunger loosely connected to said low pressure piston, a lubricant admission port adjacent one end of said low pressure cylinder, and a passageway leading from said end of said low pressure cylinder to said high pressure cylinder, the opening of said passageway into said high pressure cylinder being located at a point such that it will be uncovered by said plunger at the time when said lubricant admission port is completely covered by said low pressure piston.

2. In lubricating apparatus of the class described, the combination of three axially aligned interconnected cylinders of progressively increasing diameter formed in an integral casting, a wall between the largest and the intermediate cylinders and a wall between the intermediate and the smaller cylinders, a unitary member including a piston in the largest cylinder, a priming piston in the intermediate cylinder, and a plunger in the smallest cylinder, means for alternately admitting a fluid under pressure to said largest cylinder upon opposite sides of the piston therein, a passageway connecting the rear ends of said intermediate and said smallest cylinders, fluid adapted to operate said unitary member whereby said plunger will uncover the end of said passageway in said smallest cylinder shortly prior to the completion of the retractile stroke of said plunger, and means for supplying lubricant to said intermediate cylinder.

3. A pneumatically operated high pressure lubricant compressor comprising a body having an air cylinder, a low pressure lubricant cylinder and a high pressure lubricant cylinder formed therein, a handle at one end of said body, a valve selectively operable alternately to admit air under pressure to opposite ends of said air cylinder, a piston in said air cylinder, a piston in said low pressure lubricant cylinder, a stem rigidly connecting said pistons, means to prevent passage of lubricant from said low pressure cylinder to said air cylinder, a passageway within said body and connecting the rear ends of said high and said low pressure cylinders, a high pressure plunger secured to said low pressure piston and operable near the end of its retractile stroke to uncover the outlet end of said passageway and during the major portion of its pressure stroke to cover said end of said passageway, and a lubricant discharge conduit connected to said body at the end of said high pressure cylinder.

4. A pneumatically operated high pressure lubricant compressor comprising a body having an air cylinder, a low pressure lubricant cylinder and a high pressure lubricant cylinder formed therein, a handle at one end of said body, a valve selectively operable alternately to admit air under pressure to opposite end of said air cylinder, a piston in said air cylinder, a piston in said low pressure lubricant cylinder, a plunger reciprocable in said high pressure lubricant cylinder, means connecting both said pistons and said plunger in axial alignment, means to prevent passage of lubricant from said low pressure cylinder to said air cylinder, a passageway within said body and connecting the rear ends of said low and high pressure cylinders, the outlet end of said passageway in said high pressure cylinder being adapted to be uncovered by said plunger near the end of its retractile stroke, a plurality of openings in said body leading into said passageway, and removable plugs in said openings.

5. In a lubricant compressor, the combination of a low pressure cylinder and a high pressure cylinder in substantial alignment, a piston in said low pressure cylinder, a solid plunger secured to said piston and operable in said high pressure cylinder, a filling opening near the rear end of said low pressure cylinder closed by said piston in a retractive position, the displacement of said low pressure piston in this position being substantially equal to the total displacement of said plunger, a discharge passageway leading from said end of said cylinder to the rear end of said high pressure cylinder, a piston rod secured to said piston, and an air pressure actuated piston and cylinder, said air pressure actuated piston and the piston in said low pressure cylinder being rigidly interconnected.

In witness whereof, I hereunto subscribe my name this 12th day of September, 1928.

NORMAND W. MORSE.